US008937868B2

United States Patent
Kim et al.

(10) Patent No.: US 8,937,868 B2
(45) Date of Patent: Jan. 20, 2015

(54) METHOD FOR AND APPARATUS FOR FEEDING BACK CHANNEL INFORMATION IN WIRELESS COMMUNICATION SYSTEM

(75) Inventors: Tae-Yoon Kim, Seongnam-si (KR); Joo-Han Kim, Yongin-si (KR); Chae-Man Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 13/552,050

(22) Filed: Jul. 18, 2012

(65) Prior Publication Data

US 2013/0021931 A1 Jan. 24, 2013

(30) Foreign Application Priority Data

Jul. 18, 2011 (KR) .................. 10-2011-0070822

(51) Int. Cl.
*H04W 4/00* (2009.01)
*H04B 17/00* (2006.01)
*H04L 1/00* (2006.01)
*H04L 1/20* (2006.01)

(52) U.S. Cl.
CPC ............ *H04B 17/006* (2013.01); *H04L 1/0003* (2013.01); *H04L 1/0009* (2013.01); *H04L 1/0019* (2013.01); *H04L 1/0026* (2013.01); *H04L 1/20* (2013.01); *H04B 17/0067* (2013.01); *H04B 17/0077* (2013.01)

USPC .......... 370/239; 370/252; 455/67.13; 455/69; 455/226.3

(58) Field of Classification Search
None
See application file for complete search history.

(56) References Cited

U.S. PATENT DOCUMENTS

| 2004/0120411 | A1* | 6/2004 | Walton et al. | 375/260 |
|---|---|---|---|---|
| 2006/0008020 | A1* | 1/2006 | Blankenship et al. | 375/261 |
| 2006/0275962 | A1 | 12/2006 | Lee | |
| 2008/0240030 | A1* | 10/2008 | Kolding et al. | 370/329 |
| 2009/0274204 | A1* | 11/2009 | Chen et al. | 375/228 |
| 2010/0061473 | A1* | 3/2010 | Choi et al. | 375/260 |
| 2010/0284454 | A1* | 11/2010 | Oteri et al. | 375/224 |
| 2011/0122787 | A1* | 5/2011 | Wang et al. | 370/252 |
| 2011/0138260 | A1* | 6/2011 | Savin | 714/795 |

* cited by examiner

*Primary Examiner* — Ian N Moore
*Assistant Examiner* — Eric P Smith
(74) *Attorney, Agent, or Firm* — Jefferson IP Law, LLP

(57) ABSTRACT

A method and an apparatus for feeding back channel information in a wireless communication system are provided. The method includes calculating an average Signal to Interference and Noise Ratio (SINR), determining a Modulation and Coding Scheme (MCS) level corresponding to the average SINR, determining an MCS level meeting a predefined condition among MCS levels equal to or less than the determined MCS level, and reporting a channel quality indicator representing the determined MCS level to a base station.

16 Claims, 5 Drawing Sheets

METHOD FOR AND APPARATUS FOR FEEDING BACK CHANNEL INFORMATION IN WIRELESS COMMUNICATION SYSTEM

PRIORITY

This application claims the benefit under 35 U.S.C. §119(a) of a Korean patent application filed on Jul. 18, 2011 in the Korean Intellectual Property Office and assigned Serial No. 10-2011-0070822, the entire disclosure of which is hereby incorporated by reference.

BACKGROUND OF THE INVENTION

1. Field of the Invention

The present invention relates to a method and an apparatus for feeding back channel information in a wireless communication system. More particularly, the present invention relates to a method and an apparatus for feeding back channel information having low complexity in a wireless communication system.

2. Description of the Related Art

A wireless communication system utilizes a structure for feeding back channel information in order to improve system performance, and research for improving the system performance through this structure is in constant progress. For example, the wireless communication system of the related art uses an Exponential Effective Signal to interference ratio Mapping (EESM)-based feedback method for allowing a terminal to report an effective Signal to Interference and Noise Ratio (SINR) to a base station, and at this point, an alternative for reducing feedback information is being studied and developed.

Accordingly, a technique for allowing a terminal to estimate a relation between a beta value $\beta$ that changes depending on a Modulation and Coding Scheme (MCS) level and an effective SINR, and report the estimated relation information to a base station has been recently suggested. In this technique, when the terminal calculates an effective SINR for each beta value $\beta$, generates a function for estimating a relation between the beta value $\beta$ and the effective SINR utilizing the calculated effective SINR, and reports the generated function to a base station, the base station calculates an effective SINR using a beta value $\beta$ for each MCS level using the reported function, and selects an MCS level meeting a target error rate for the effective SINR.

However, as described above, although the method for reporting an effective SINR has an advantage of reducing feedback information, a current commercial system uses a structure for allowing a terminal to calculate an MCS level meeting an error rate and report CQI representing the MCS level, so that the above method cannot be applied.

Furthermore, the effective SINR calculating method using the EESM technique of the related art calculates an effective SINR using a beta value $\beta$ for each MCS level, and determines an MCS level meeting a target error rate with respect to each effective SINR using an Additive White Gaussian Noise (AWGN) packet error performance curve. Accordingly, the effective SINR calculating method using the EESM technique of the related art has to perform a test for all MCS levels in order from a high MCS level to a low MCS level, thereby complicating the calculation process.

Therefore, a need exists for a method and an apparatus for feeding back channel information having low calculation complexity that is applicable to a current commercial system.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for feeding back channel information in a wireless communication system.

Another aspect of the present invention is to provide a method and an apparatus for feeding back channel information based on an Exponential Effective Signal to interference ratio Mapping (EESM) in a wireless communication system.

Another aspect of the present invention is to provide a method and an apparatus for determining a Modulation and Coding Scheme (MCS) level based on an average Signal to Interference and Noise Ratio (SINR) when feeding back channel information based on EESM in a wireless communication system.

Another aspect of the present invention is to provide a method and an apparatus for determining an MCS level based on an offset value depending on a packet error when feeding back channel information based on EESM in a wireless communication system.

In accordance with an aspect of the present invention, a method for feeding back channel information in a wireless communication system is provided. The method includes calculating an average SINR, selecting an MCS level corresponding to the average SINR, determining an MCS level meeting a predefined condition among MCS levels equal to or less than the selected MCS level, and reporting a channel quality indicator representing the determined MCS level to a base station.

In accordance with another aspect of the present invention, an apparatus for feeding back channel information in a wireless communication system is provided. The apparatus includes a controller for calculating an average SINR, for selecting an MCS level corresponding to the average SINR, and for determining an MCS level meeting a predefined condition among MCS levels equal to or less than the selected MCS level, and a transceiver for reporting a channel quality indicator representing the determined MCS level to a base station.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWING

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
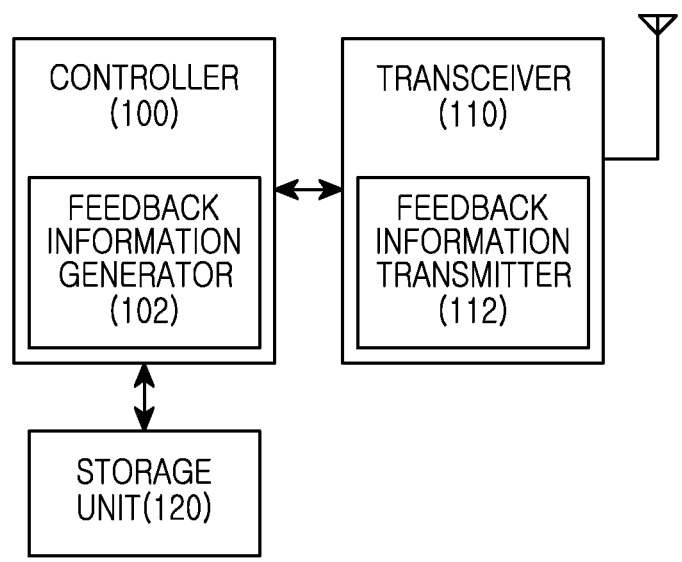
FIG. 1 is a block diagram illustrating a terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms, "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for feeding back channel information having low complexity in an Exponential Effective Signal to interference ratio Mapping (EESM)-based structure in a wireless communication system.

FIGS. 1 through 5, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating a terminal according to an exemplary embodiment of the present invention.

Referring to FIG. 1, the terminal includes a controller 100, a transceiver 110, and a storage unit 120. More particularly, the controller 100 includes a feedback information generator 102. The transceiver 110 includes feedback information transmitter 112.

The controller 100 controls and processes an overall operation of the terminal, and particularly controls and processes a function for feeding back channel information to a base station via the feedback information generator 102. The feedback information generator 102 calculates an average Signal to Interference and Noise Ratio (SINR) and sets a Modulation and Coding Scheme (MCS) level for the average SINR to a start point to control and process a function for performing a procedure for retrieving an MCS level among MCS levels lower than the MCS level set to the start point. Here, the procedures of setting of the MCS level corresponding to the average SINR to the start point and retrieving of the MCS levels lower than the set MCS level are selected because an effective SINR is always equal to or less than the average SINR as expressed in Equations (1) through (3) below.

Equation (1) expresses an effective SINR.

$$\gamma_{\mathit{eff}} = -\beta \ln\left(\frac{1}{N}\sum_{i}^{N}\exp\left(-\frac{\gamma_i}{\beta}\right)\right) \quad (1)$$

where $\gamma_{\mathit{eff}}$ denotes an effective SINR, $\beta$ denotes a parameter having a different value for each MCS level, $\gamma_i$ denotes an SINR for each subcarrier, and N denotes the number of total Resource Elements (REs). Here, since $\gamma_i$ and $\beta$ have a value greater than $$0 (\gamma_i > 0, \beta > 0), 0 < \exp\left(\frac{\gamma_i}{\beta}\right) < 1$$

is satisfied. When an inequality of Arithmetic means (Am)–Geometric mean (Gm) is applied, Equation (2) is obtained.

$$\sum_{i}^{N}\exp\left(-\frac{\gamma_i}{\beta}\right) \geq \left[\prod_{i}^{N}\exp\left(-\frac{\gamma_i}{\beta}\right)\right]^{\frac{1}{N}} \quad (2)$$

When $-\beta \ln(\ )$ is applied to both sides of Equation (2), Equation (3) is obtained.

$$-\beta\ln\left(\sum_{i}^{N}\exp\left(-\frac{\gamma_i}{\beta}\right)\right) \leq \frac{\beta}{N}\ln\left(\prod_{i}^{N}\exp\left(-\frac{\gamma_i}{\beta}\right)\right) = \quad (3)$$

$$-\frac{\beta}{N}\ln\left(\exp\left(\sum_{i}^{N}-\frac{\gamma_i}{\beta}\right)\right) = \frac{1}{N}\sum_{i}^{N}\gamma_i$$

In Equation (3), $$\frac{1}{N}\sum_{i}^{N}\gamma_i$$

denotes an average SINR.

That is, Equation (3) represents a characteristic that an effective SINR is always equal to or less than the average SINR. According to this characteristic, the feedback information generator 102 calculates an effective SINR with respect to lower MCS levels starting from an MCS level for the average SINR, and determines an MCS level based on the calculated result.

Specifically, the feedback information generator 102 calculates an average SINR with respect to all REs from which a signal is received, and determines an MCS level meeting a target error rate with respect to the average SINR using an Additive White Gaussian Noise (AWGN) packet error performance curve. Thereafter, the feedback information generator 102 sets the determined MCS level to a start point, calculates an effective SINR for each MCS level using a beta value β corresponding to MCS levels equal to or less than the start point, and compares the effective SINR with a threshold SINR to determine whether to report a relevant MCS level to a base station. Here, the threshold MCS level denotes a minimum SINR value meeting the target error rate with respect to a relevant MCS level. When the effective SINR has a value equal to or greater than the threshold SINR, the feedback information generator 102 determines to report an MCS level corresponding to the effective SINR to the base station. In contrast, when the effective SINR is less than the threshold SINR, the feedback information generator 102 repeatedly performs a process for calculating an effective SINR with respect to an MCS level lower by one step than the MCS level corresponding to the effective SINR and comparing the effective SINR with the threshold SINR. That is, the feedback information generator 102 repeatedly performs a process for calculating an effective SINR in an order of lower MCS levels from the MCS level which is the start point until the effective SINR becomes equal to or greater than the threshold SINR.

In addition, to reduce calculation complexity for determining an MCS level, the feedback information generator 102 may limit the number of times in calculating the effective SINR. For example, the feedback information generator 102 may set the number of times of effective SINR calculation to three to calculate an effective SINR from an MCS level N determined as a start point to a level N−2, and compare the effective SINR with the threshold SINR to determine an MCS level. At this point, in preparation for a case of being able to retrieve an MCS level meeting a condition within the set number of times, the feedback information generator 102 may set an offset value for an effective SINR depending on whether a received packet is erroneous and retrieve the MCS level meeting the condition within a smaller number of times. Of course, even when the number of times of effective SINR calculation is not limited, the feedback information generator 102 may reduce the number of times of effective SINR calculation performed until an MCS level is determined by applying an offset as illustrated in Equation (4).

Equation (4) represents an offset value for an effective SINR.

$$\text{offset} = \text{offset}_{k-1} + \alpha \cdot (\text{FER}_{target} - 1), \text{for NACK}$$

$$\text{offset} = \text{offset}_{k-1} + \alpha \cdot \text{FER}_{target}, \text{for ACK} \quad (4)$$

In Equation (4), $\text{offset}_{k-1}$ denotes an offset value used when a previous MCS level is determined. An initial offset value may be set to 0. In addition, α is a weight and may be set to an optimized value through experiment during a design process. $\text{FER}_{target}$ represents a target Frame Error Rate, a Non ACKnowledgement (NACK) represents that an error is generated regarding a received packet, and an ACKnowledgement (ACK) represents that a received packet is normally received. Here, the offset value may be calculated only once every feedback generation period and may be calculated and updated periodically whenever a packet is received for generating the feedback information. Here, in a case of calculating an offset value periodically whenever a packet is received, the feedback information generator 102 may obtain an average of offset values calculated from a point of reporting previous feedback information to a point of reporting current feedback information, and use the average offset value.

That is, the feedback information generator 102 determines whether an error is generated to a received packet to calculate an offset, calculates an effective SINR when generating feedback information, and adds the offset value to the calculated effective SINR to compare the effective SINR to which the offset has been reflected with a threshold SINR, thereby determining whether to report a relevant MCS level to a base station. At this point, since the offset value may diverge under a very high SINR environment or a very low SINR environment, the feedback information generator 102 limits a range of the offset value. That is, when the offset value calculated via Equation (4) is a maximum value of a predefined range or more, the feedback information generator 102 resets the offset value to the maximum value. When the offset value calculated via Equation (4) is a minimum value of a predefined range or less, the feedback information generator 102 resets the offset value to the minimum value.

The feedback information generator 102 determines an MCS level to be reported to a base station using the above-described exemplary method, and controls and processes a function for feeding back a Channel Quality Indicator (CQI) corresponding to the determined MCS level to a serving base station.

The transceiver 110 processes a signal transmitted/received to/from a base station under control of the controller 100. More particularly, the transceiver 110 controls and processes a function for feeding back a CQI provided from the feedback information generator 102 to the base station every predefined period by including the feedback information transmitter 112.

The storage unit 120 stores data and various programs for an overall operation of the terminal. More particularly, the storage unit 120 stores a relation between an MCS level and a value β, and stores a relation between the MCS level and a CQI. In addition, the storage unit 120 stores an AWGN curve for each MCS level. Here, the AWGN curve denotes a curve representing a relation between an SINR for a relevant MCS level and a packet error rate under an AWGN environment.

An exemplary procedure for operating a terminal is described below with reference to FIG. 1.

Figure 2:
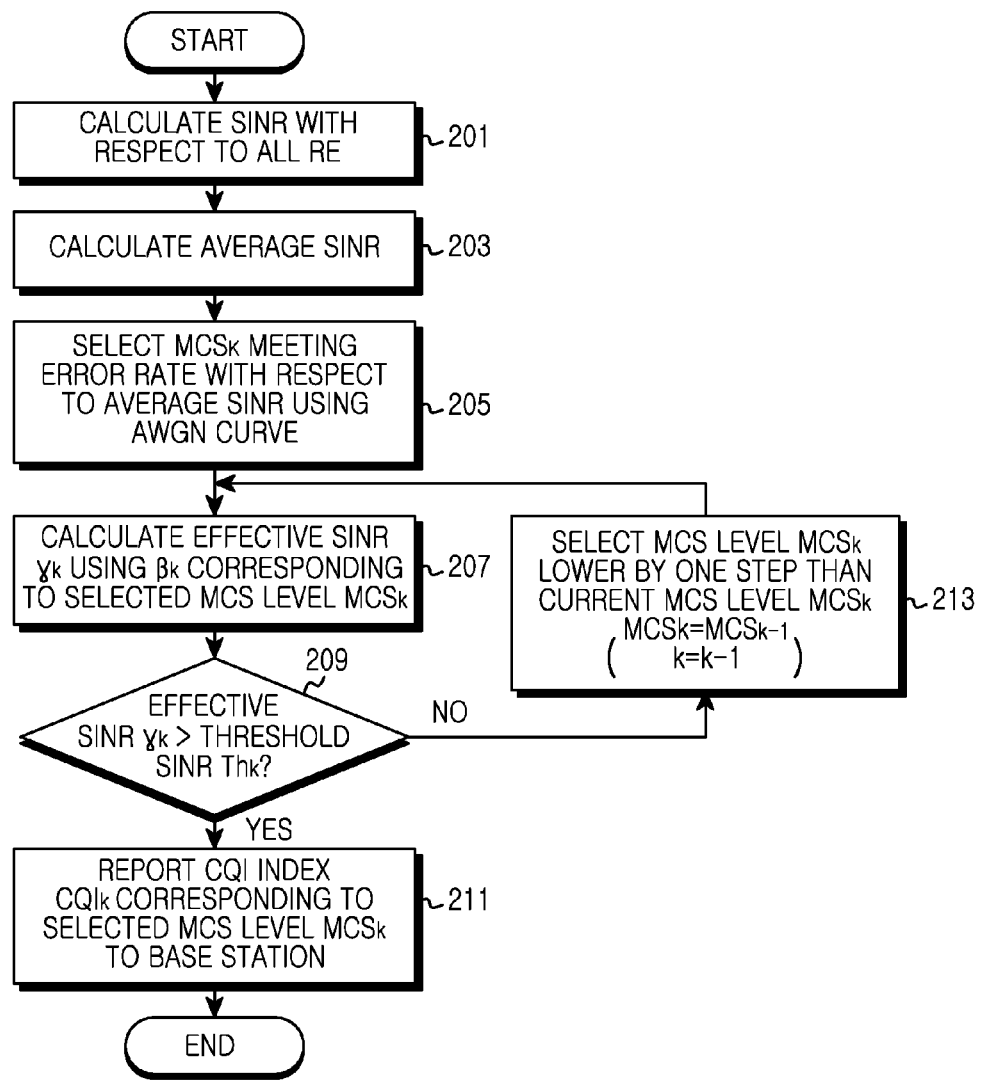
FIG. 2 is a flowchart illustrating a procedure for determining a Modulation and Coding Scheme (MCS) level in a terminal according to an exemplary embodiment of the present invention.

FIG. 2 is a flowchart illustrating a procedure for determining an MCS level in a terminal according to an exemplary embodiment of the present invention.

Referring to FIG. 2, the terminal calculates an SINR with respect to all REs from which a signal is received in step 201, and proceeds to step 203 to calculate an average SINR. Here, the terminal may calculate an SINR using methods of the related art.

In an exemplary implementation, the terminal selects an MCS level meeting a target error rate with respect to the average SINR using an AWGN curve representing a relation between an SINR for each MCS level under an AWGN environment and an error rate in step 205. Here, the selected MCS level is called MCSk. At this point, in the case where a plurality of MCS levels meeting the target error rate exist with respect to the average SINR, the terminal may select a largest MCS level among the plurality of MCS levels.

In an exemplary implementation, the terminal calculates an effective SINR ($\gamma_k$) using a β value corresponding to the selected MCS level (MCSk) in step 207. Here, the effective SINR ($\gamma_k$) may be calculated using Equation (1). After calculating the effective SINR ($\gamma_k$), the terminal proceeds to step 209 to compare the effective SINR ($\gamma_k$) with a threshold SINR ($Th_k$). Here, the threshold SINR denotes a minimum SINR value meeting a target error rate with respect to a relevant MCS level.

When the effective SINR ($\gamma_k$) is equal to or greater than the threshold SINR ($Th_k$), the terminal proceeds to step 211 to determine an MCS level corresponding to the effective SINR ($\gamma_k$), and reports a CQI representing the determined MCS level to a base station, and then ends the algorithm.

In contrast, when the effective SINR ($\gamma_k$) is less than the threshold SINR ($Th_k$), the terminal proceeds to step 213 to select an MCS level ($MCS_k=MCS_{k-1}$) lower by one step than a current MCS level ($MCS_k$), and returns to step 207 to re-perform the subsequent steps. That is, the terminal determines whether an effective SINR of a relevant MCS level is equal to or greater than the threshold SINR by lowering an MCS level by one step from an MCS level that is a start point until the effective SINR becomes equal to or greater than the threshold SINR, and when the effective SINR of the relevant MCS level becomes equal to or greater than the threshold SINR, the terminal reports the relevant MCS level to a base station.

Figure 3:
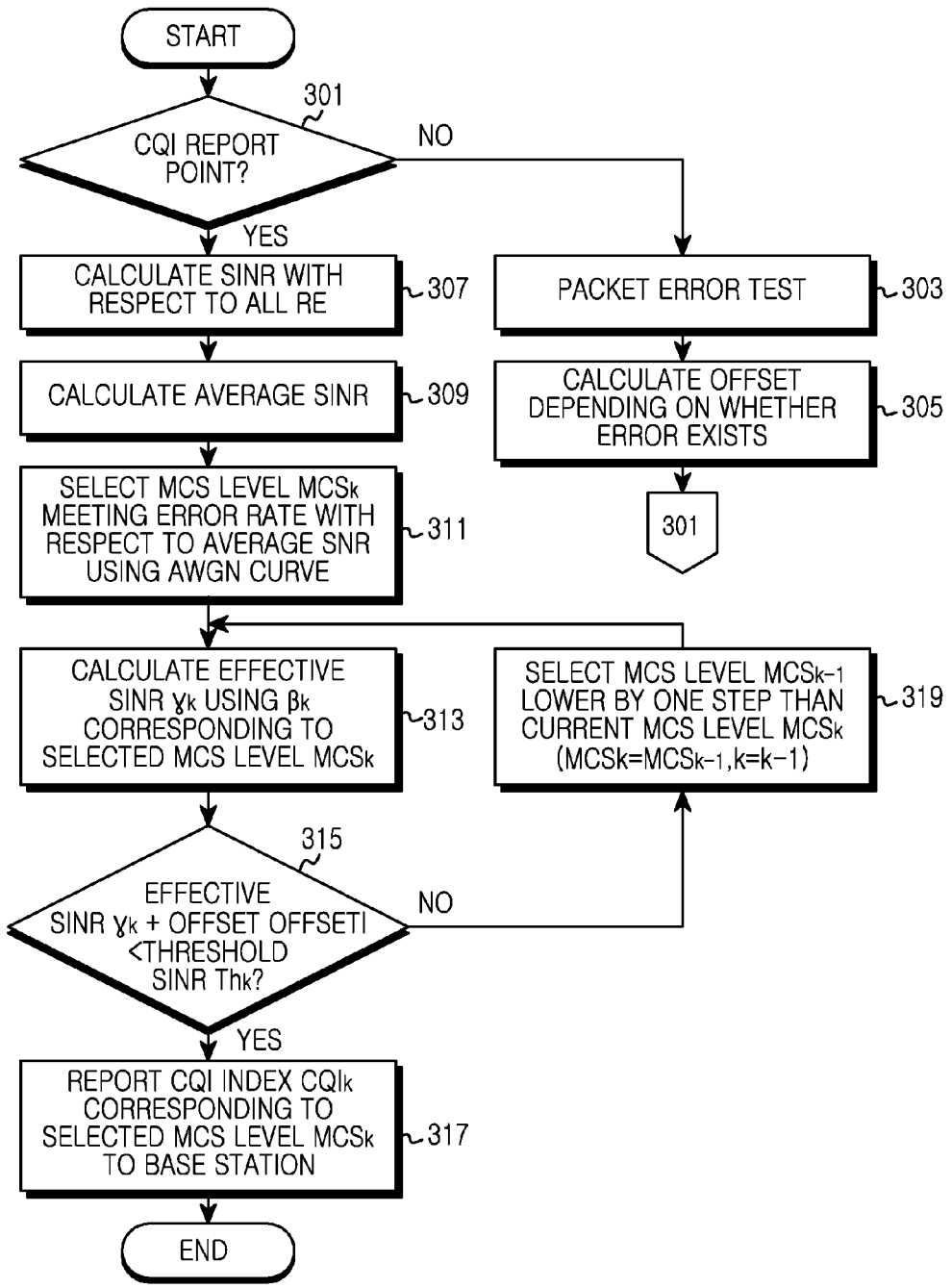
FIG. 3 is a flowchart illustrating a procedure for determining an MCS level using an offset value depending on a packet error in a terminal according to an exemplary embodiment of the present invention.

FIG. 3 is a flowchart illustrating a procedure for determining an MCS level using an offset value depending on a packet error in a terminal according to an exemplary embodiment of the present invention.

Referring to FIG. 3, the terminal determines whether a CQI report point arrives in step 301. The CQI report point may be periodic and may be generated when needed. When the CQI report point does not arrive, the terminal determines whether a received packet has an error in step 303, and proceeds to step 305 to calculate an offset value of an effective SINR depending on whether the packet has an error. Here, the offset value may be calculated using Equation (4). At this point, when the offset value deviates from a predefined range as a result of calculation of the offset value using Equation (4), the terminal resets the offset value to a value within the predefined range. For example, when the offset value calculated using Equation (4) is equal to or greater than a maximum value of the predefined range, the terminal resets the offset value to the maximum value. When the offset value calculated using Equation (4) is equal to or less than a minimum value of the predefined range, the terminal resets the offset value to the minimum value. Thereafter, the terminal returns to step 301 to re-perform the subsequent steps.

In contrast, when the CQI report point arrives, the terminal calculates an SINR with respect to all REs from which a signal is received in step 307, and proceeds to step 309 to calculate an average SINR. Here, the terminal may calculate the SINR using the methods of the related art.

Thereafter, the terminal selects an MCS level meeting a target error rate with respect to the average SINR using an AWGN packet error performance curve representing a relation between an SINR for each MCS level and an error rate in step 311. Here, the selected MCS level is called MCSk. At this point, in the case where a plurality of MCS levels meeting the target error rate exist with respect to the average SINR, the terminal may select a largest MCS level among the plurality of MCS levels.

Thereafter, the terminal calculates an effective SINR ($\gamma_k$) using a β value corresponding to the selected MCS level ($MCS_k$) in step 313. Here, the effective SINR ($\gamma_k$) may be calculated using Equation (1). After calculating the effective SINR ($\gamma_k$), the terminal proceeds to step 315 to add the offset value calculated in step 305 to the effective SINR ($\gamma_k$) and compares an effective SINR value ($\gamma_k$+ offset) that reflects the offset value with a threshold SINR ($Th_k$). Here, the threshold SINR denotes a minimum SINR value meeting a target error rate with respect to a relevant MCS level.

When the effective SINR value ($\gamma_k$+ offset) that reflects the offset value is equal to or greater than the threshold SINR ($Th_k$), the terminal proceeds to step 317 to determine an MCS level corresponding to the effective SINR ($\gamma_k$), and reports a CQI representing the determined MCS level to a base station, and then ends the algorithm.

In contrast, when the effective SINR value ($\gamma_k$+ offset) that reflects the offset value is equal to or less than the threshold SINR ($Th_k$), the terminal proceeds to step 319 to select an MCS level ($MCS_k=MCS_{k-1}$) lower by one step than a current MCS level ($MCS_k$), and returns to step 313 to re-perform the subsequent steps. That is, the terminal determines whether a value where the offset has been added to the effective SINR value of the relevant MCS level is equal to or greater than the threshold SINR by lowering an MCS level by one step from an MCS level that is a start point until the effective SINR value ($\gamma_k$+ offset) that reflects the offset value becomes equal to or greater than the threshold SINR, and when the value where the offset has been added to the effective SINR value ($\gamma_k$) of the relevant MCS level is equal to or greater than the threshold SINR, the terminal reports the relevant MCS level to a base station.

Figure 4A:
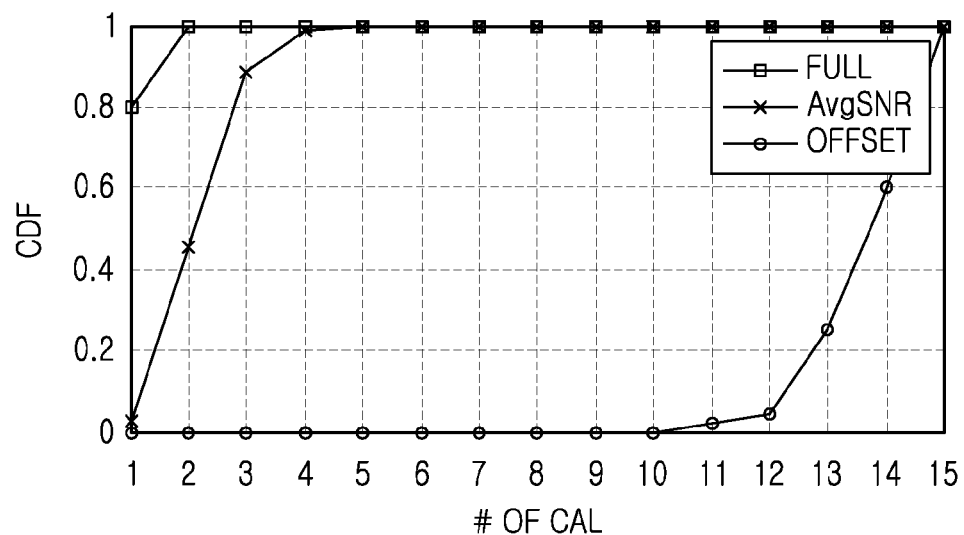
FIGS. 4A and 4B are graphs representing calculations of effective Signal to Interference and Noise Ratio (SINR) in a case of determining an MCS level according to exemplary embodiments of the present invention and the related art.
Figure 4B:
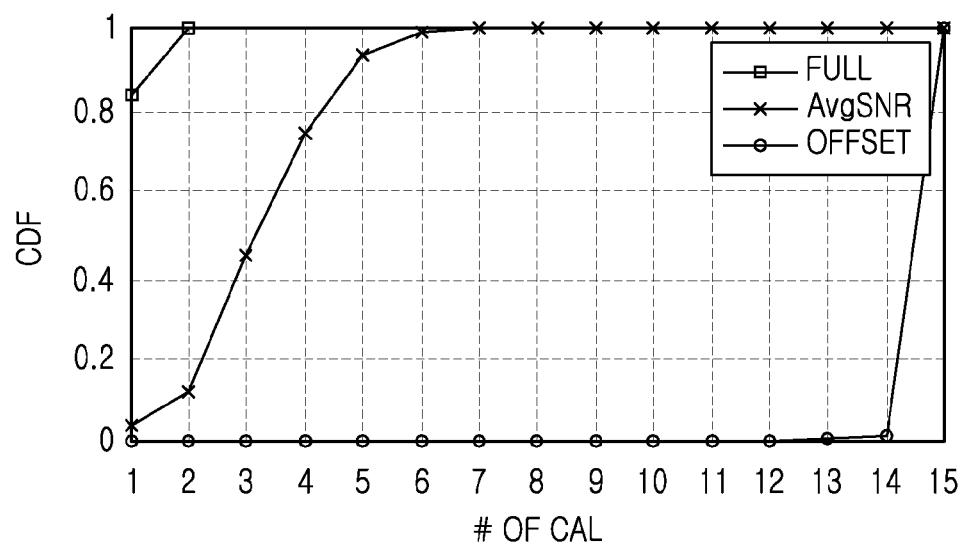

FIGS. 4A and 4B are graphs representing calculations of effective SINR in a case of determining an MCS level according to exemplary embodiments of the present invention and the related art. Here, the horizontal axis represents the number of times of calculation of an effective SINR until an MCS level is determined, and the vertical axis represents accumulated distribution of generation frequency.

FIGS. 4A and 4B illustrate generation frequencies for the number of times of calculation of an effective SINR until a terminal determines an MCS level according to exemplary embodiments of the present invention and the related art. Here, "Full" illustrates a case where a terminal starts calculation of an effective SINR from a maximum MCS level according to the related art, "AvgSNR" illustrates a case where a terminal sets an MCS level corresponding to an average SINR to a start point, and calculates an effective SINR with respect to MCS levels equal to or less than the start point according to exemplary embodiments of the present invention, and "Offset" illustrates a case where a terminal calculates an effective SINR with consideration of an offset value in addition to "AvgSNR" according to exemplary embodiments of the present invention.

Referring to FIGS. 4A and 4B, compared to "Full" of the related art that starts effective SINR calculation from the maximum MCS level, "AvgSNR" and "Offset" of the present invention that determine an MCS level corresponding to the average SINR as the start point and determine the effective SINR with respect to an MCS level equal to or less than the start point require a smaller number of times of calculation of an effective SINR until an MCS level is determined. In addition, compared to "AvgSNR" that does not consider an offset, "Offset" that considers the offset additionally requires a smaller number of times of calculation of an effective SINR until an MCS level is determined.

Figure 5:
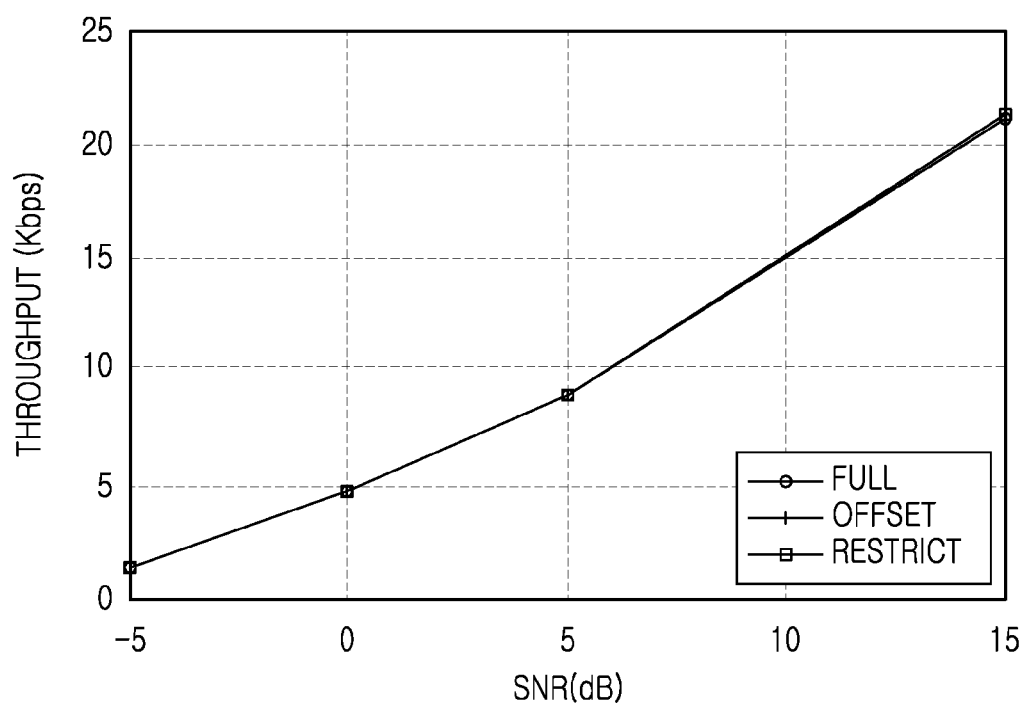
FIG. 5 is a graph illustrating performance in a case of determining an MCS level according to an exemplary embodiment of the present invention and the related art.

FIG. 5 is a graph illustrating performance in a case of determining an MCS level according to an exemplary embodiment of the present invention and the related art. Here, the horizontal axis represents an SINR, and the vertical axis represents a throughput.

Referring to FIG. 5, the performance of "Full" representing the related art and the performance of "AvgSNR" and "Offset" proposed by exemplary embodiments of the present invention are the same. That is, even when an effective SINR is obtained with respect to MCS levels equal to or less than an MCS level of the average SINR as proposed by an exemplary embodiment of the present invention, the same performance as the related art may be obtained.

As illustrated in FIGS. 4A, 4B, and 5, the methods proposed by exemplary embodiments of the present invention may obtain the same performance as the method of the related art while reducing the number of calculations compared to the related art to reduce a delay by the calculation.

When feeding back channel information based on EESM in a wireless communication system, an effective SINR is calculated with respect to MCS levels equal to or less than an MCS level corresponding to an average SINR, and an MCS level of the effective SINR meeting a threshold SINR is selected to report a CQI representing the MCS level to a base station, thereby reducing calculation complexity without a performance loss. In addition, when feeding back channel information based on EESM in a wireless communication, an MCS level is determined using an offset value by a packet error, thereby additionally reducing the number of times of calculation of an effective SINR.

It will be appreciated that exemplary embodiments of the present invention according to the claims and description in the specification can be realized in the form of hardware, software or a combination of hardware and software.

Any such software may be stored in a computer readable storage medium. The computer readable storage medium stores one or more programs (i.e., software modules), the one or more programs comprising instructions, which when executed by one or more processors in an electronic device, cause the electronic device to perform an exemplary method of the present invention.

Any such software may be stored in the form of volatile or non-volatile storage, such as a storage device like a Read Only Memory (ROM), whether erasable or rewritable or not, or in the form of memory, such as a Random Access Memory (RAM), memory chips, device or integrated circuits or on an optically or magnetically readable medium, such as a Compact Disc (CD), a Digital Video Disc (DVD), a magnetic disk, a magnetic tape, or the like. It will be appreciated that the storage devices and storage media are exemplary embodiments of machine-readable storage that are suitable for storing a program or programs comprising instructions that, when executed, implement exemplary embodiments of the present invention.

Accordingly, exemplary embodiments of the present invention provide a program comprising code for implementing an apparatus or a method as claimed in any one of the claims of this specification and a machine-readable storage for storing such a program.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for feeding back channel information in a wireless communication system, the method comprising:
    determining an average Signal to Interference and Noise Ratio (SINR);
    selecting a Modulation and Coding Scheme (MCS) level corresponding to the average SINR;
    determining a first effective SINR corresponding to the selected MCS;
    determining a second effective SINR by adding an effective SINR offset value depending on a packet error with the first effective SINR;
    determining an MCS level among MCS levels equal to or less than the selected MCS level by comparing the second effective SINR with a threshold SINR; and
    transmitting a Channel Quality Indicator (CQI) representing the determined MCS level to a base station,
    wherein the determining of the second effective SINR comprises:
    determining whether the effective SINR offset value exceeds a threshold range; and
    if the effective SINR offset value exceeds the threshold range, setting the effective SINR offset value to a value within the threshold range.

2. The method of claim 1, wherein the selecting of the MCS level corresponding to the average SINR comprises selecting an MCS level meeting a target error rate with respect to the average SINR based on an Additive White Gaussian Noise (AGWN).

3. The method of claim 1, wherein the determining of the MCS level among the MCS levels equal to or less than the selected MCS level comprises:
    if the second effective SINR is equal to or greater than the threshold SINR, determining the selected MCS level as an MCS level meeting a predefined condition.

4. The method of claim 3, further comprising, if the second effective SINR is less than the threshold SINR, repeatedly performing a process of redetermining an MCS level of a lower step than the currently determined MCS level to calculate the second effective SINR until the second effective SINR equal to or greater than the threshold SINR is calculated.

5. The method of claim 4, wherein the number of times for repeatedly performing the process of redetermining the MCS level of a lower step than the currently determined MCS level is limited.

6. The method of claim 3, wherein the threshold SINR comprises a minimum SINR value meeting a target error rate with respect to an MCS level corresponding to the first effective SINR.

7. The method of claim 1, wherein the effective SNR offset value is determined using the following Equation when an error is generated regarding a received packet:

$$\text{offset} = \text{offset}_{k-1} + \alpha \cdot (\text{FER}_{target} - 1), \text{for NACK},$$

where offsetk−1 is an effective SINR offset value used when a previous MCS level is determined, α is a weight value, FERtarget is a target Frame Error Rate, and a Non ACKnowledgement (NACK) represents that an error is generated regarding the received packet.

8. The method of claim 1, wherein the effective SINR offset value is determined using the following Equation when an error is not generated regarding a received packet:

$$\text{offset} = \text{offset}_{k-1} + \alpha \cdot \text{FER}_{target}, \text{for ACK},$$

where offsetk−1 is an effective SINR offset value used when a previous MCS level is determined, α is a weight value, FERtarget is a target Frame Error Rate, and an ACKnowledgement (ACK) represents that the received packet is normally received.

9. An apparatus for feeding back channel information in a wireless communication system, the apparatus comprising:
    a controller for determining an average Signal to Interference and Noise Ratio (SINR), for selecting a Modulation and Coding Scheme (MCS) level corresponding to the average SINR, for determining a first effective SINR corresponding to the selected MCS, for determining a second effective SINR by adding an effective SINR offset value depending on a packet error with the first effective SINR, and for determining an MCS level error among MCS levels equal to or less than the selected MCS level by comparing the second effective SINR with a threshold SINR; and a transceiver for transmitting a Channel Quality Indicator (CQI) representing the determined MCS level to a base station, wherein the controller determines whether the effective SINR offset value exceeds a threshold range, and if the effective SINR offset value exceeds the threshold range, sets the effective SINR offset value to a value within the threshold range.

10. The apparatus of claim 9, wherein the controller selects an MCS level meeting a target error rate with respect to the average SINR based on an Additive White Gaussian Noise (AGWN).

11. The apparatus of claim 9, wherein if the second effective SINR is equal to or greater than the threshold SINR, the controller determines the selected MCS level as an MCS level meeting a predefined condition.

12. The apparatus of claim 11, wherein if the second effective SINR is less than the threshold SINR, the controller repeatedly performs a process of redetermining an MCS level of a lower step than the currently determined MCS level to calculate the second effective SINR until the second effective SINR equal to or greater than the threshold SINR is determined.

13. The apparatus of claim 12, wherein the controller limits the number of times for repeatedly performing the process of redetermining the MCS level of a lower step than the currently determined MCS level.

14. The apparatus of claim 11, wherein the threshold SINR comprises a minimum SINR value meeting a target error rate with respect to an MCS level corresponding to the first effective SINR.

15. The apparatus of claim 9, wherein the controller calculates the effective SINR offset value using the following Equation when an error is generated regarding a received packet:

$$\text{offset} = \text{offset}_{k-1} + \alpha \cdot (\text{FER}_{target} - 1), \text{for NACK},$$

where $\text{offset}_{k-1}$ is an effective SINR offset value used when a previous MCS level is determined, $\alpha$ is a weight value, FERtarget is a target Frame Error Rate, and a Non ACKnowledgement (NACK) represents that an error is generated regarding the received packet.

16. The apparatus of claim 9, wherein the controller calculates the effective SINR offset value using the following Equation when an error is not generated regarding a received packet:

$$\text{offset} = \text{offset}_{k-1} + \alpha \cdot \text{FER}_{target}, \text{for ACK},$$

where $\text{offset}_{k-1}$ is an effective SINR offset value used when a previous MCS level is determined, $\alpha$ is a weight value, FERtarget is a target Frame Error Rate, and an ACKnowledgement (ACK) represents that the received packet is normally received.

* * * * *